Sept. 1, 1942.  A. E. SPICER  2,294,427
BATTERY
Filed Nov. 29, 1940  2 Sheets-Sheet 2
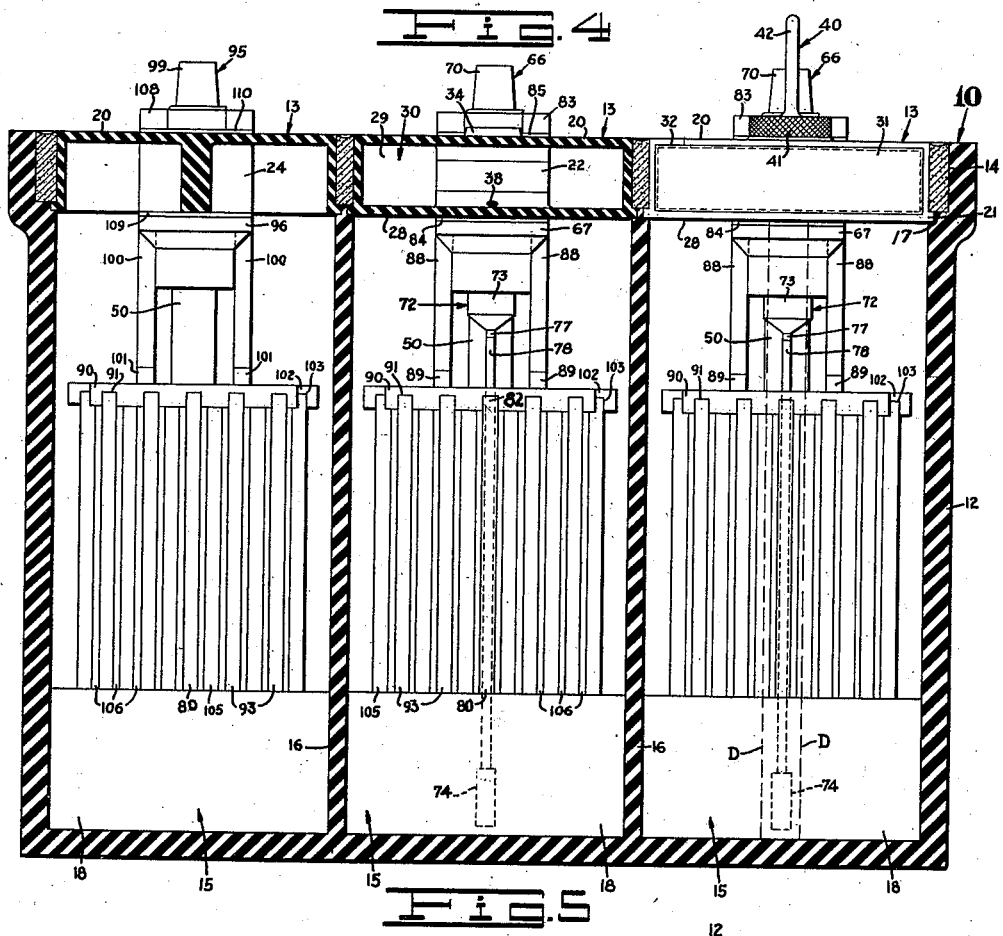
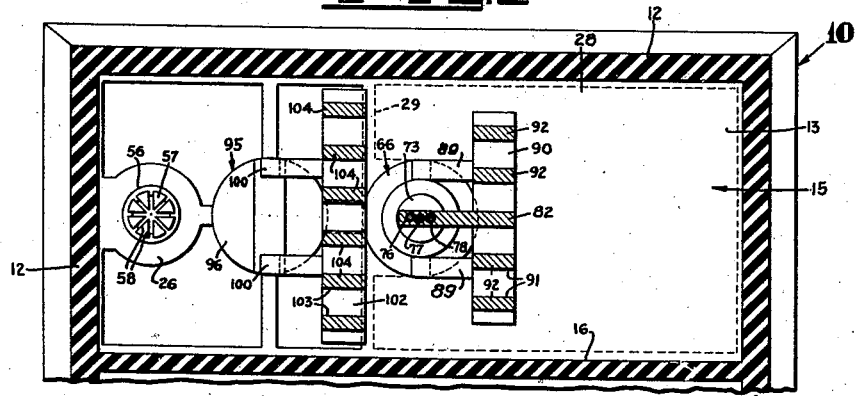
INVENTOR.
Arthur E. Spicer.
BY Patented Sept. 1, 1942

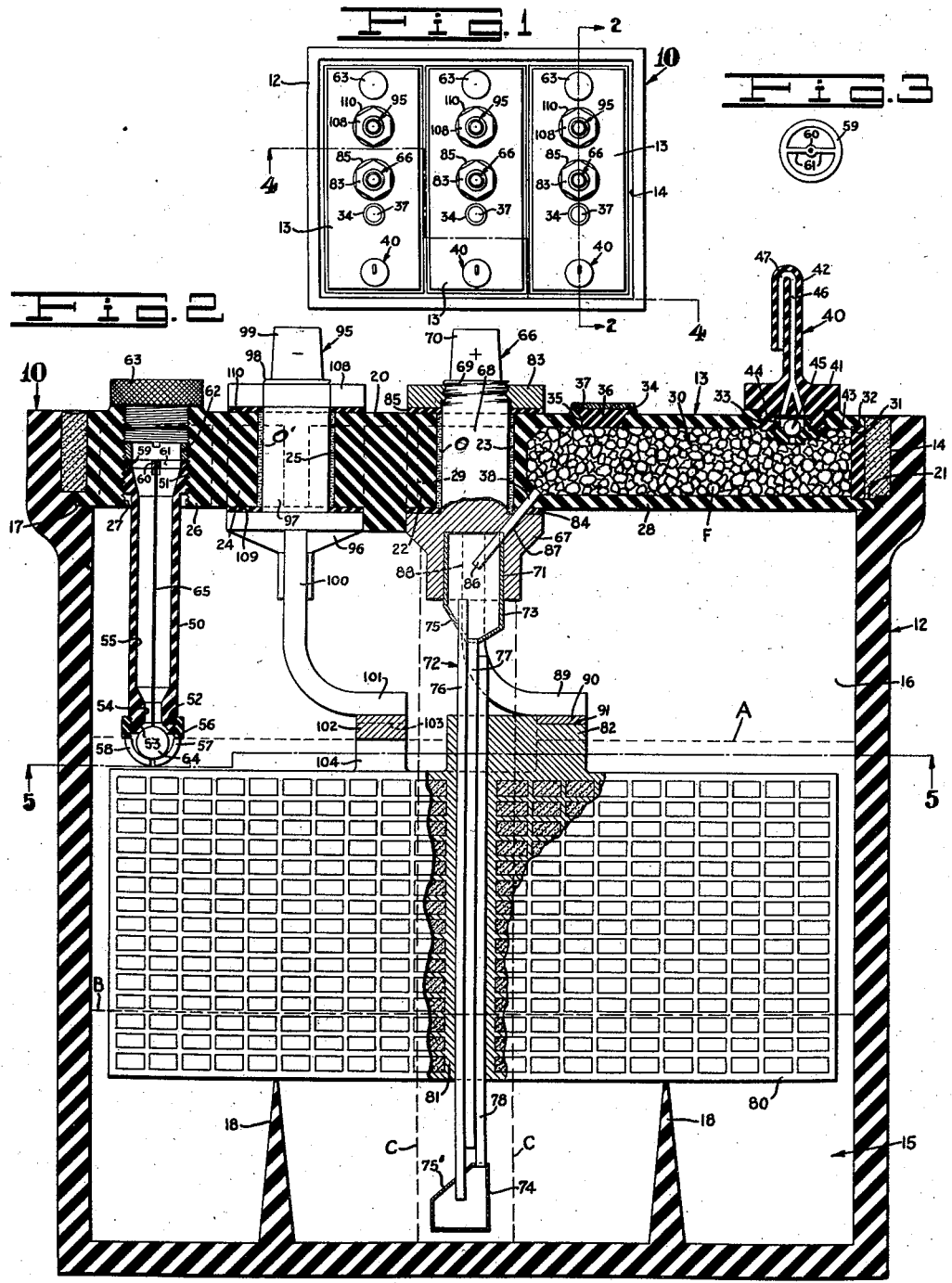

2,294,427

UNITED STATES PATENT OFFICE 2,294,427

BATTERY

Arthur E. Spicer, Los Angeles County, Calif.

Application November 29, 1940, Serial No. 367,750

3 Claims. (Cl. 136—177)

This invention relates to storage batteries.

The general object of the invention is to provide an improved storage battery which may be tilted at sharp angles or may be inverted as in submarine, in aircraft, or in other uses, without causing damage to the battery or impairing its efficiency, and without causing escape of liquid.

Another object of the invention is to provide a multi-cell storage battery with novel venting means.

Another object of the invention is to provide a storage battery having novel means for allowing the same to breathe.

Another object of the invention is to provide a novel filler tube for a storage battery.

An additional object of the invention is to provide a novel closure member for a storage battery case.

Other objects and advantages of the invention will be apparent from the following description taken in connection with the accompanying drawings, wherein:

Fig. 1 is a top plan view of my improved storage battery with the sealing compound omitted;

Fig. 2 is an enlarged section through one of the cells taken on line 2—2, Fig. 1;

Fig. 3 is a top plan view of the filler tube washer;

Fig. 4 is an enlarged section taken on line 4—4, Fig. 1 with the plate and separator members left in full; and Fig. 5 is a fragmentary, reduced section, taken on line 5—5, Fig. 2.

Referring to the drawings by reference characters I have indicated my improved storage battery generally at 10. As shown the device 10 includes an open topped casing 12 closed by a plurality of cell covers 13.

The casing shown at 12 has an enlarged recess 14 therein adjacent the top and is divided into three cells 15 by two integral partitions 16 which terminate at the bottom of the recess 14.

Adjacent the tops each of the cells 15 has an enlarged recess 17 therein. At the bottom the casing has a pair of spaced transverse ribs 18 therein of a predetermined height.

Each of the cell covers 13 includes a box-like body portion 20 having an enlarged bottom flange 21 thereon which is positioned in the recess 17 of the cell for which it forms the cover. The cell cover further includes a central terminal sleeve 22 having an aperture 23 therein and at one side thereof another terminal sleeve 24 having an aperture 25 therein. Intermediate the sleeve 24 and the adjacent end the cell cover includes a reduced sleeve 26 having a threaded aperture 27 therein.

On the side thereof opposite the boss 24 the body 20 includes a bottom 28 and a connecting transverse wall 29 which joins the central sleeve 22 together with the bottom 28 to form a chamber 30. The end of the chamber 30 opposite the wall 29 is closed by a member 31 positioned in suitable recesses 32 provided in the body and is preferably cemented in place. The member 31 may be made integral with the body 20, in which case the chamber 30 will be filled through a suitable plug to be later described.

Before the member 31 is placed in position the chamber 30 is filled with a suitable filter material such as coarsely granulated charcoal and bone as indicated by F.

Opening through the top thereof into the chamber 30 the body 20 has a threaded aperture 33 therein and adjacent the central sleeve 22 the body top includes a reduced boss 34 having an aperture 35 therein opening into the chamber 30. The aperture 35 is provided for assembly purposes and is thereafter closed by a suitable plug 36 which is retained in place by a suitable sealing material 37, or as by threading.

Opening into the chamber 30 the central sleeve 22 has an aperture 38 therein opening through the bottom thereof and angularly positioned to open into the chamber adjacent the bottom thereof and having the axis thereof aligned with the axis of the aperture 35.

As a closure for the aperture 33 I provide a breather member indicated generally at 40 which includes a body portion 41 having an upwardly extending stem 42 and a reduced externally threaded boss 43 positioned in the threaded aperture 33. The boss 43 has a threaded recess 44 therein in which a check valve device 45 is positioned. The body 41 and stem 42 have a conduit 46 therein which at the lower end opens into the recess 44 and the opposite end curves back upon itself as at 47 and extends downwardly to a predetermined distance above the body 41 where it opens into the atmosphere.

The check valve device 45 allows unrestricted passageway from the chamber 30 into and through the conduit 46 and prevents passage from the conduit 46 into the chamber 30.

Positioned in the threaded aperture 27 I provide a filler tube 50 the upper end of which includes an enlarged externally threaded head 51 positioned in the threaded aperture 27. The opposite end of the tube 50 is externally threaded as at 52 and has a valve seat recess 53 therein which communicates with a reduced aperture 54 which in turn communicates with an enlarged recess 55 opening through the top of the tube.

A cap member 56 threadedly engages the lower end of the tube 50 and includes a hollow semi-cylindrical portion 57 having a plurality of slots 58 therein. Positioned on top of the tube head 51 I provide a washer member 59 which includes a central apertured member 60 which is supported from the sides by legs 61. (See Fig. 3.) To retain the filler tube in an adjusted position I provide an apertured lock nut 62 and to close the aperture 27 I provide a threaded closure plug 63.

Positioned in the semi-cylindrical portion 57 of the plug cap 56 I provide a buoyant ball member 64 having a wire stem 65 thereon which extends upward and is positioned in the apertured member 60 of the washer 59. When the ball 64 is in its lowermost position as shown in Fig. 2 the upper end of the wire stem 65 is flush with the top of the member 60.

Positioned in the aperture 23 of the central sleeve 22 I provide a positive terminal member which is indicated generally at 66. As shown the terminal 66 includes a body portion 67 of greater diameter than the boss aperture 23 and a reduced shank portion 68 which is of less diameter than the sleeve aperture 22. Adjacent the upper end of the shank 68 includes a threaded portion 69 and thereabove it includes a reduced tapered terminal post 70. Opening through the bottom thereof the body 67 has a recess 71 therein.

Associated with the terminal member 66 I provide a ventilating device which is indicated generally at 72. As shown the device 72 includes an upper cup-like member 73 and a lower enclosed chamber member 74. The bottom of the cup member 73 includes an inclined portion 75. The upper wall of the member 74 is inclined upwardly towards the top thereof as indicated at 75'.

A tube 76 at one side of the center of the cup 73 extends upwardly thereinto a predetremined distance and extends downwardly and into the chamber member 74 a predetermined distance. The tube 76 is suitably hermetically secured to both the cup member 73 and the chamber member 74.

Opening into the cup 73 at the bottom and on the center thereof I provide a tube 77 which extends downwardly to a predetermined distance above the chamber member 74. The tube 77 is suitably hermetically secured to the cup member 73.

Opening into the chamber member 74 through the top thereof at the side of the central tube 77 opposite the tube 76 I provide a tube 78 which extends upward and terminates a predetermined distance below the cup member 73. The tube 78 is suitably hermetically secured to the chamber member 74.

The three tubes 76, 77, and 78 are preferably cast into the center of a grid plate 80 which is of conventional design except it includes a solid central portion 81 in which the tubes are positioned. The central portion 81 extends above the top of the grid plate and at one side thereof to form a securing lip 82.

The cup member 73 is positioned in the recess 71 of the terminal 66 and is suitably hermetically secured thereto.

The terminal 66 is positioned in the aperture 23 of the central sleeve 22 and is clamped in position by a nut member 83. Positioned between the terminal shank 68 and the sleeve 22 I provide a sealing washer 84 and positioned between the nut 83 and the top of the cover I provide a sealing washer 85.

The space between the terminal shank 68 and the walls of the aperture 23 is filled with a suitable mineral oil as clearly shown at 0 in Fig. 2.

After the terminal 66 is properly secured to the cell cover a rubber tube 86 is positioned in the cover aperture 38 and extends through suitably aligned apertures 87 in the terminal body 67, washer 84, and cup 73 and terminates approximately at the center of the cup a predetermined distance from the bottom of the recess 71.

The tube 86 is placed in position through the assembly aperture 35 before the same is closed and sealed.

A pair of vertical arms 88 are secured to opposite sides of the terminal body 67 and extend downwardly a predetermined distance and curve to one side to form horizontal arm portions 89.

A transverse bar 90 is secured to the underside of the arm portions 89. The underside of the bar 90 has a plurality of equally spaced transverse grooves 91 therein, the center one of which receives the securing lip 82 of the grid plate 80 and the remainder receive the securing lips 92 of other standard type positive grid plates 93.

Positioned in the cover aperture 25 I provide a negative terminal member 95. As shown the terminal 95 includes a body portion 96 of greater diameter than the boss aperture 25 and a reduced shank portion 97 which is of less diameter than the aperture 22. Adjacent the upper end the shank 97 includes a threaded portion 98 and thereabove it includes a reduced tapered connection boss 99.

A pair of vertical arms 100 similar to the arms 88 are secured to opposite sides of the terminal body 96 and extend downward a predetermined distance and curve to one side to form horizontal portions 101.

A transverse bar 102 is secured to the underside of the arm portions 101. The underside of the bar 102 has a plurality of equally spaced transverse grooves 103 therein to receive the securing lips 104 of a plurality of standard type negative grid plates 105.

The terminal 95 is positioned in the aperture 25 of the boss 24 and is clamped in position by a nut member 108. Positioned between the terminal base 96 and the lower end of the boss I provide a sealing washer 109 and positioned between the nut 108 and the top of the cover I provide a sealing washer 110.

The space between the terminal shank 97 and the walls of the aperture 25 is filled with a suitable mineral oil as clearly shown at 0' in Fig. 2.

The positive grid plates are positioned between the negative grid plates and are retained in spaced apart relation by standard type separators 106. All the plates and the separators are adapted to rest on the upper surfaces of the ribs 18.

In operation the plug 63 is removed and a suitable liquid acid solution is placed in each of the cells 15 until the level of the liquid in each cell is a predetermined distance above the plates as indicated by the broken line A in Fig. 2.

When the liquid in the cell reaches the proper level the buoyant ball 64 moves upward into engagement with the valve seat 52 and when it does it moves the wire stem 65 upward above the member 60 to signal the operator that the liquid in the cell has reached the proper level.

When the battery is charged and starts to function the gas generated in each cell 15 passes through the vent device 72 therein. To pass through the vent device 72 the gas enters the upper end of the tube 78 and passes downward therein into the chamber member 74 and thence upward through the tube 76 into the cup 73. The gas then passes into the tube 86 into the chamber 30 where it is filtered through the material F and passes to the vent device 40.

The check valve 45 of the vent device 40 causes a pressure to build up in the chamber 30, the vent device 72, and in the cell 15 and when this pressure is sufficient to overcome the weight of the check valve ball it unseats the ball and forms thereby and into and through the conduit 46 to the atmosphere.

If in service the battery 10 is turned upside down it will still function in a proper manner. When the battery is upside down the liquid in the cells 15 is approximately at the level indicated by the broken line B in Fig. 2. In this position the gas enters the tube 77 and passes therethrough into the cup 73, thence through the tube 86 into the chamber 30 and therefrom to the atmosphere through the vent device 40.

When the battery is turned on one side or the other the liquid level in the cells is spaced below the vent tubes 77 and 78 as indicated by the broken lines C in Fig. 2.

When the battery is turned on one end or the other the liquid level in the cells is spaced below the vent tubes 77 and 78 as indicated by the broken lines D in Fig. 4.

Furthermore when the battery is tilted at any angle either the open end of the vent tube 77 or the open end of the vent tube 78 will be above the liquid level. Thus no matter what position the battery is in, all or portions of the plates will be submerged and at the same time the cells will be properly ventilated to allow correct functioning of the battery.

When the battery 10 is used in a submarine and the submarine is disabled and the battery compartment becomes flooded the gas generated by the battery is neutralized by passing through the filter material F and does not cause deadly chlorine gas to be produced from salt water.

From the foregoing description it will be apparent that I have provided a novel storage battery which is simple in construction and highly efficient in use.

Having thus described my invention, I claim:

1. In a battery, a casing having a cell therein, a closure for the casing, said closure having a chamber therein, a breather member including a conduit from said chamber to the atmosphere, said closure having an aperture, a terminal extending through said aperture, said terminal and said closure having aligned apertures, a tube passing through said apertures, a cup member on said terminal, said tube extending into said cup member and opening into said chamber, a grid in said cell between the top and bottom thereof, means connecting the terminal member to the grid, a second cup member in the casing below the grid, conduit means affording communication between the cup members, said conduit means projecting into the interior of each cup member, a second conduit means communicating with the terminal cup member and extending to a location below the grid and a third conduit means extending from the lower cup member to a location above the grid.

2. In a battery, a casing having a cell therein, a closure for the casing, said closure having a chamber therein, a breather member including a conduit from said chamber to the atmosphere, said closure having an aperture, a terminal extending through said aperture, said terminal and said closure having aligned apertures, a tube passing through said apertures, said terminal having a recess, said tube extending into said recess and opening into said chamber, a cup member mounted in said recess, a grid in said cell between the top and bottom thereof, means connecting the terminal member to the grid, a second cup member in the casing below the grid, conduit means affording communication between the cup members, said conduit means projecting into the interior of each cup member, a second conduit means communicating with the terminal cup member and extending to a location below the grid and a third conduit means extending from the lower cup member to a location above the grid.

3. In a battery, a casing having a cell therein, a closure for the casing, said closure having a chamber therein, a breather member including a conduit to the atmosphere from said chamber, a one-way valve for the conduit, said closure having an aperture, a terminal extending through said aperture, said terminal and said closure chamber having diagonally disposed aligned apertures, a hard rubber tube passing through said apertures, said terminal having a recess, said tube extending into said recess, a cup member mounted in said recess, a grid in said cell between the top and bottom thereof, means connecting the terminal member to the grid, a second cup member in the casing below the grid, conduit means affording communication between the cup members, said conduit means projecting into the interior of each cup member, a second conduit means communicating with the terminal cup member and extending to a location below the grid and a third conduit means extending from the lower cup member to a location above the grid.

ARTHUR E. SPICER.